United States Patent [19]

Bruno

[11] Patent Number: 5,188,217

[45] Date of Patent: Feb. 23, 1993

[54] DEVICE FOR THE RECEIVING AND SYNCHRONIZED TRANSFERRING OF VARIOUS ARTICLES

[75] Inventor: Righi Bruno, Bologna, Italy

[73] Assignee: O.A.M S.p.A, Bologna, Italy

[21] Appl. No.: 830,701

[22] Filed: Feb. 4, 1992

[30] Foreign Application Priority Data

Feb. 7, 1991 [IT] Italy ............................. 000091 A/91

[51] Int. Cl.⁵ ............................................ B65G 47/86
[52] U.S. Cl. .................... 198/803.9; 198/473.1; 198/476.1
[58] Field of Search ............... 198/456, 470.1, 473.1, 198/476.1, 477.1, 803.7, 803.9, 803.11; 53/251, 252, 257, 261, 566

[56] References Cited

U.S. PATENT DOCUMENTS

| | | | |
|---|---|---|---|
| 2,358,292 | 9/1944 | Malhiot | 198/803.11 |
| 3,608,701 | 9/1971 | Dieter | 53/251 |
| 4,211,054 | 7/1980 | Sramek | 53/566 |
| 4,823,934 | 4/1989 | Lemaire et al. | 198/470.1 |
| 4,829,751 | 5/1989 | Tisma | 53/252 |
| 5,072,573 | 12/1991 | Tisma | 198/803.9 |

FOREIGN PATENT DOCUMENTS 902568 6/1972 Canada .................................. 53/252
3815557 12/1988 Fed. Rep. of Germany .

*Primary Examiner*—Joseph E. Valenza
*Attorney, Agent, or Firm*—McAulay Fisher Nissen Goldberg & Kiel

[57] ABSTRACT

A conveyor is located between a machine for separating articles and a machine for packing the articles, and comprises two chains linked to each other by stems, with slides mounted on each couple of stems. Each slide has a roller running in a first guide so that the slide moves transversely to the conveyor because of the changes in the path of the first guide; a panel is fixed to each slide, and two walls are located on the panel. One of these walls is mobile since it is linked to a roll running in a second guide formed by consecutive sections positioned at different distance from the first guide. The mobile wall is moved away from the other when an article is introduced between time, and then the mobile wall is moved toward the other so that the distance between them is equal to the size of the article.

5 Claims, 3 Drawing Sheets

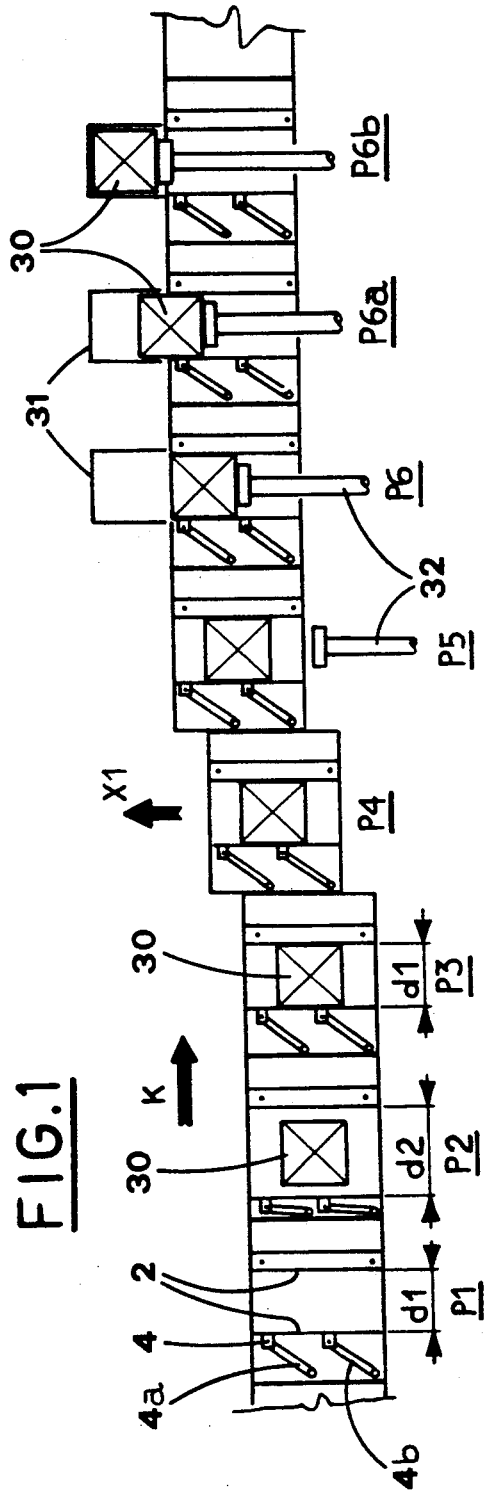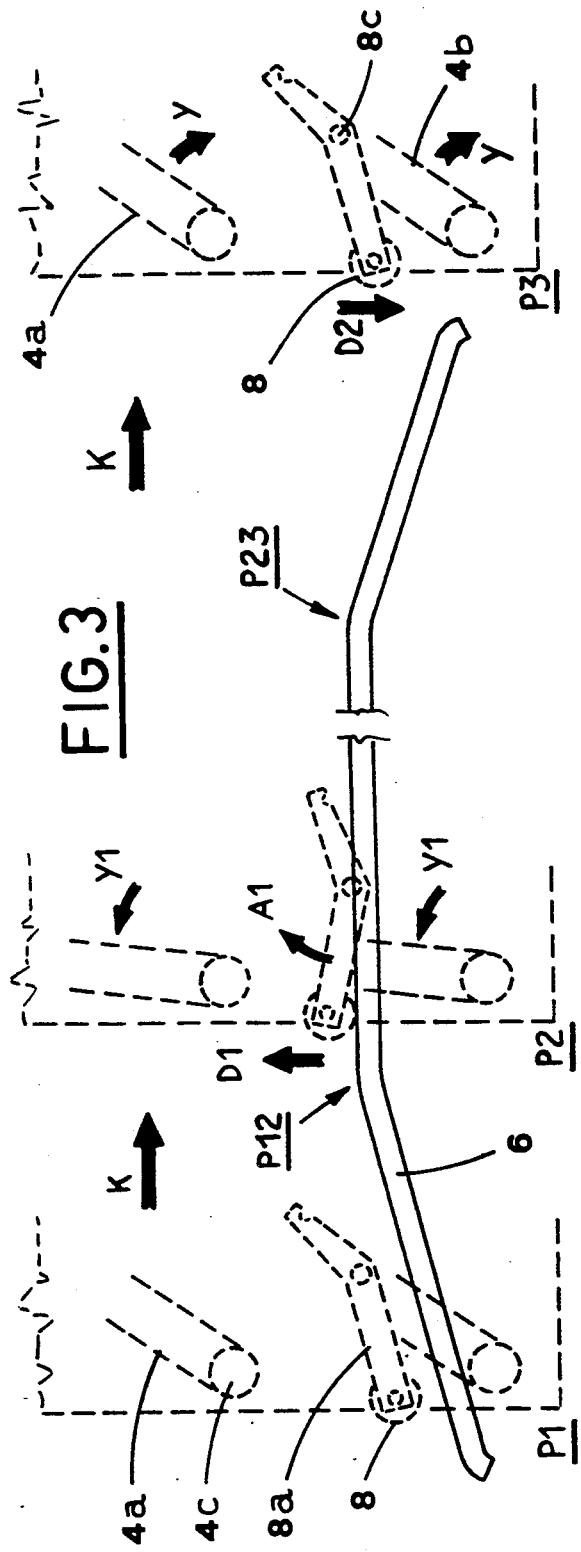

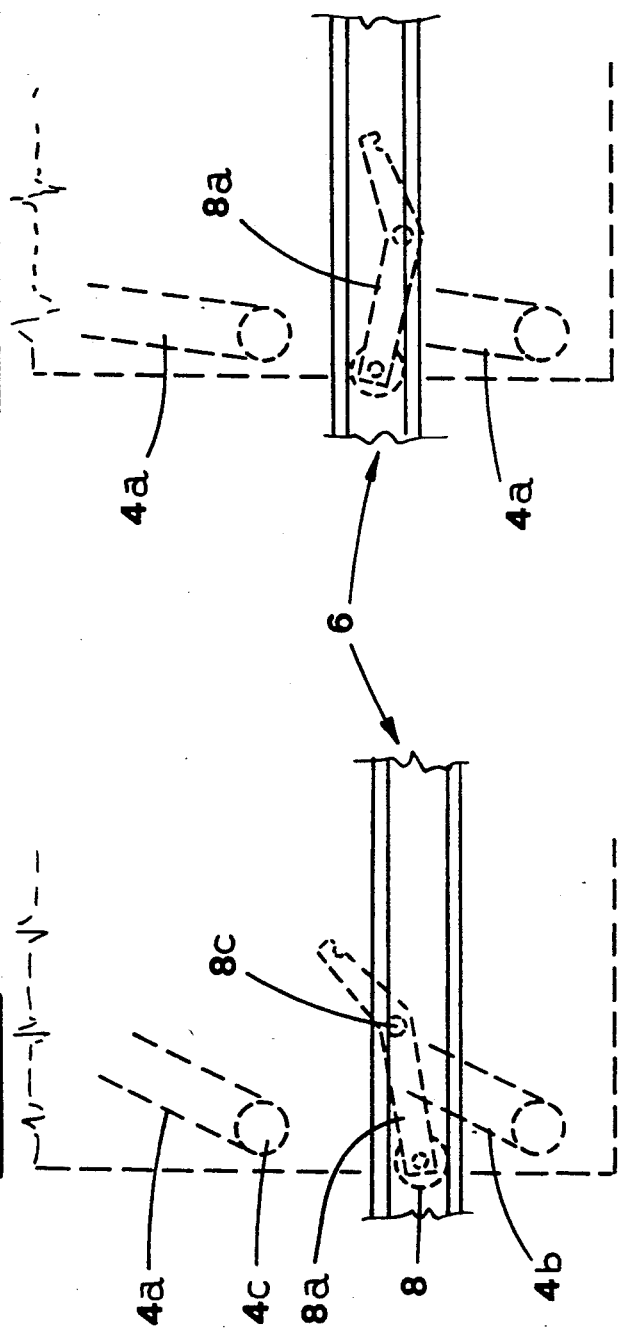
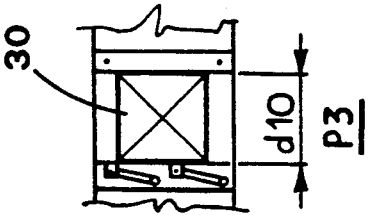
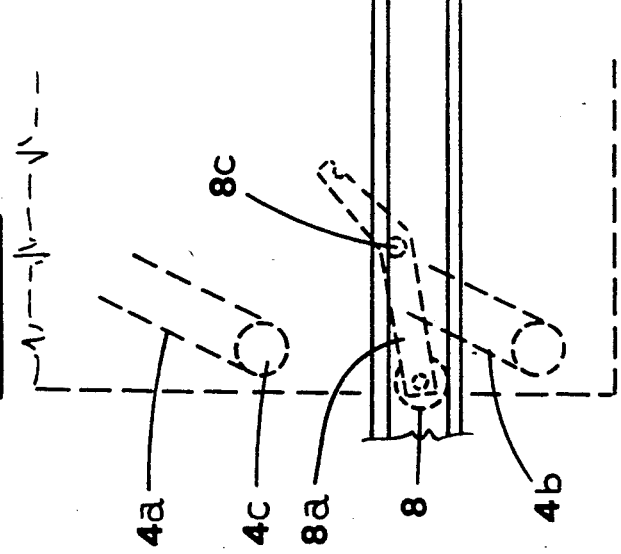
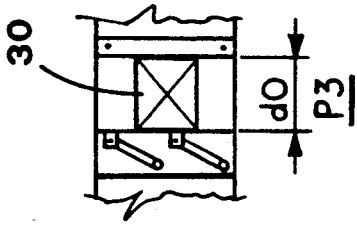

DEVICE FOR THE RECEIVING AND SYNCHRONIZED TRANSFERRING OF VARIOUS ARTICLES

BACKGROUND OF THE INVENTION

The proposed invention relates to the field concerned with packing, in particular with packing different articles in containers or boxes.

DESCRIPTION OF THE PRIOR ART

Devices are known that carry out what above is mentioned, e.g. of the type comprising a line destined to receive articles in a suited station associated with the initial section of said line.

With said line, that is un upper branch of at least one belt conveyor in a form of a closed loop, there are cooperating means destined to carry out all the operations necessary to the insertion of said articles into relative containers.

The articles are placed in housings of this line, constituted in various ways. In a first embodiment, the housings are formed by walls or edges, fixed transversally to the direction in which the conveyor glides, in a way to receive laterally the same articles on the conveyor; the dimensions of the seats housings depend on the size of the articles being handled.

In another embodiment the housings are formed by couples of transversal prongs arranged correspondently on two longitudinal sides of the conveyor, with each prong of each couple of prongs being set distant from the relative remaining prong, with a distance equal to the width of the same article. A typical problem of all the machines of this kind is connected with the fact that in case of need it is necessary to adapt the machine when the size of the article is changed.

In such a case, in fact, it is necessary to provide a variation of the longitudinal dimension of the housings receiving these articles.

When the housings are made by walls, which are fastened alternatively to relative conveyor in such a way that they can be removed, there are slots with which means for fastening the movable walls to the conveyor engage, in such a way that, according to the need, the position of fastening of the walls can be varied, and thus the longitudinal dimension of the same housing can be varied.

Such a variation, accomplished only manually, demands a lot of time and, consequently, high personnel costs.

When the housing are made by prongs, a conveyor is prepared that is constituted by a plurality of belts, usually two or four, placed side by side, parallel to each other, and moving with the same speed.

The belts are free from each other, and carry a plurality of prongs perpendicularly fixed to the belts.

Taking as an example the solution that provides four belts, generally for articles of great dimension, the couple of external belts is linked to the relative driving means, by a known system, while the couple of internal belts can be staggered in respect to the other couple, or vice versa.

This way, by regulating the staggering between the cited couples of belts, the change of desired size is determined, as a consequence of the variation of the longitudinal distance between the prongs belonging to each couple of belts.

For smaller articles, usually only two belts are used, with a procedure for the change of size substantially identical with the one just described. Obviously, in the latter case only one belt will be moved to obtain the desired staggering between the relative prongs; moreover, the shape of the latters is such that it defines walls, since they are fixed to the relative belt at one end, while the opposite end extends above the other belt, obviously without touching it.

The solution that provides the use of belts which can be staggered, from one side allows to obtain the change of size with a smaller number of operations, from the other side however, implies considerable constructive complications with consequent costs of realization and maintaining.

Another disadvantage, common to devices of this kind, is connected to the fact that many types of articles do not have a well definite form, squared and/or rigid, but frequently have an irregular, soft form, (e.g. articles provided with lateral, heat-welded "tongues" going out of the "squared" form of the article).

This fact involves big problems, when after loading the article in one of such housings, the article are misset in rispect of the above mentioned housing. In such a case, the jamming of the whole device often takes place, with considerable disadvantages that have negative repercussions also on the productivity of the associated machines.

SUMMARY OF THE INVENTION

The object of the invention is to propose a v device that is able to carry out the above discussed operations without any mentioned jamming in any case, with any form, rigid or soft, of the article being dealt with.

In short, the device is conceived in a way to present a plurality of seats, each formed by a couple of walls, at least one of which mobile by means of suitable regulating means placed on a panel which is dragged from a conveyor of known type.

These walls are generally kept distant from the cited regulating means, the distance being coincident with the size of the article which is to be introduced between the walls, except the case in which, in a first embodiment, these regulating means provide to widen adequately the seat realized by the two walls, bringing them temporarily away from each other. This action takes place in the zone of receiving of the relative article so that it allows, in any case, to load the article correctly.

After the loading is carried out, the regulating means carry the mobile wall back to the previous distance from the other wall, correspondent to the size of the introduced article.

The regulating means are linked to a guide appropriately shaped and positioned.

The size change is performed in a very simple way and in only one operation, acting properly on the same, above cited regulating means and the guide.

The afore mentioned objects of the invention which allows to overcome all the disadvantages of the known machines of the same type, are in accordance with what described in claims.

BRIEF DESCRIPTION OF THE DRAWINGS

The characteristics of the device will be understood better from the following description of two preferred embodiments of the invention, with an illustrative and non limiting purpose, with help of accompanying figures, in which:

FIG. 1 shows a plan view of the articles holding unit in its various operational positions;

FIG. 3 shows a plan view of a guide suitably shaped in accordance with a first embodiment and, partly, of the associated regulating means constituting part of the device;

FIGS. 5, 6 show a plan view of a portion of guide in two different settings in respect to the associated regulating means, correspondent FIGS. 5a, 6a show a schematic, plan view of a holding unit on which there are arranged two articles of different size, with a setting of the receiving means and of the associated guide which corresponds to each of them, as showed in FIGS. 5 and 6, respectively.

DESCRIPTION OF THE PREFERRED EMBODIMENTS

Referring to these figures, 10 indicates a portion of a conveyor in a form of a closed loop, located between a machine of known type, not illustrated, for separating articles 30, and a second machine, neither this one illustrated, for packing these articles into relative containers 31.

Pushing means 32 are associated with this latter machine on the side opposite in respect of the containers 31, and move laterally to the conveyor 10 (FIG. 1).

Figure 2:
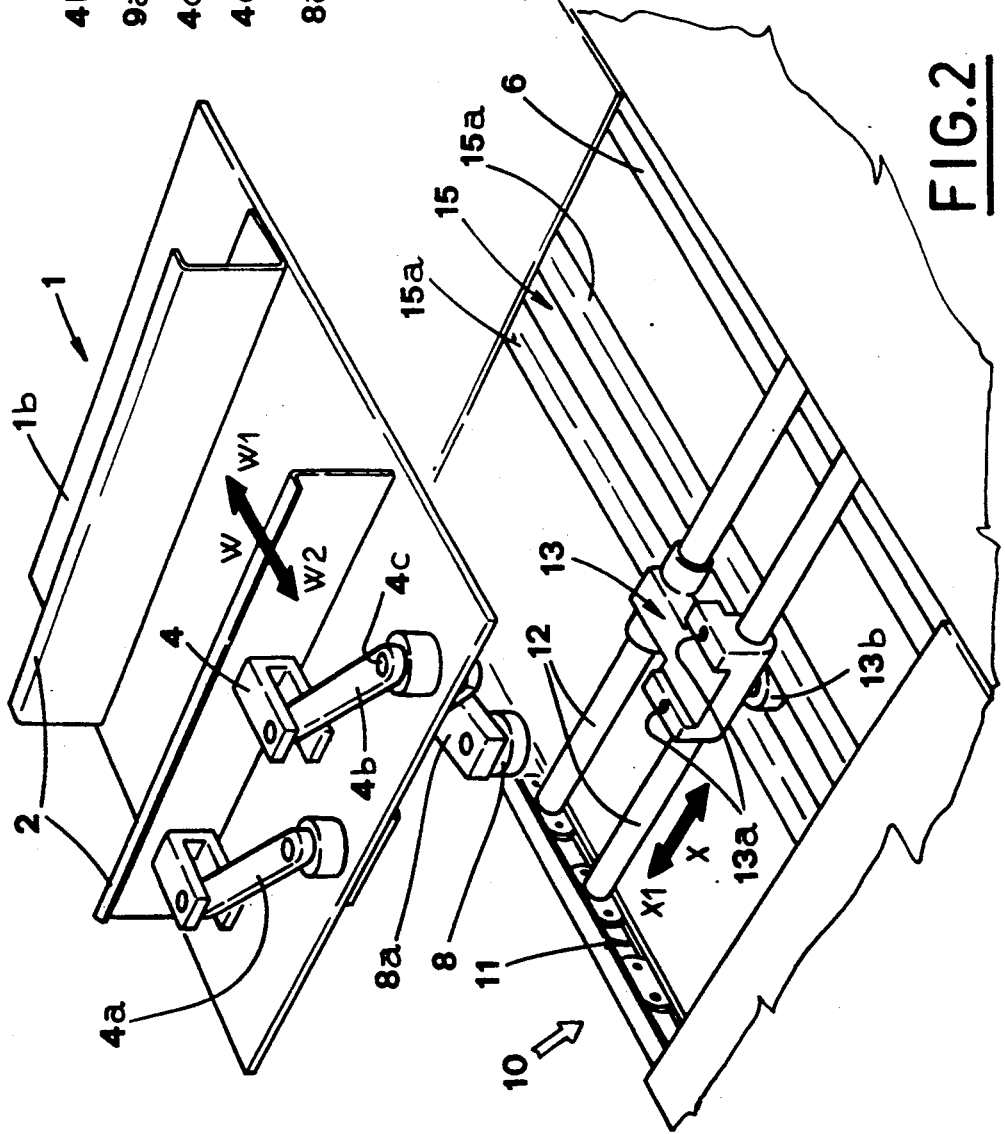
FIG. 2 shows a perspective, exploded view of a panel and, partly, the proposed device.

The conveyor 10 is provided with two lateral chains 11 connected one to another by a plurality of couples of transversal stems 12 (FIG. 2).

On each of these couples of stems there is mounted a gliding slide 13 that carries in the lower part a roll 13b running inside a first guide 15 delimited by edges 15a (FIG. 2).

The path of the guide 15 is also in a form of a closed loop and its form determines the shifting of the slide 13 in direction X, normal to the advancement direction K of the upper branch of the conveyor 10 (FIG. 2).

The slide 13 has on the upper part, a plurality of holes 13a (for example two), for movable fastening of a holding unit 1 for a correspondent article 30.

This holding unit 1 is constituted by a panel 1b, fixed to the cited slide 13.

On the external surface of the panel 1b there are located two walls 2 which are normal in respect to the direction K. At least one of such walls 2 is mobile in this direction.

Now it will be taken into consideration an embodiment that provides only one mobile wall 2, moved by means of special means regulating the mutual distance between the same walls.

Figure 4:
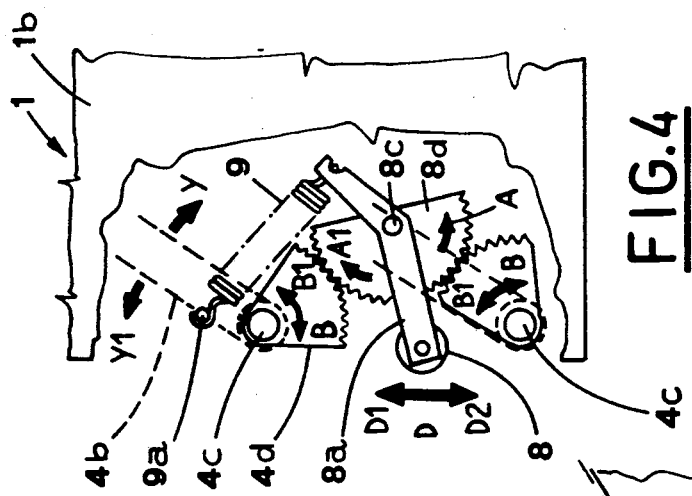
FIG. 4 is a cross-section of the details of the means regulating the size.

As an example and with reference to FIGS. 2 and 4, such regulating means comprise a couple of small arms 4a, 4b, positioned on the external surface of the panel 1b and pivoted each one with one end to the mobile wall 2 by means of a "U"- shaped element 4.

The base of each "U"-shaped element is fixed to the mobile wall 2 while the wings embrace the end of the small arm.

At the opposite ends, each of the arms 4a and 4b is fitted on a correspondent pin 4c rotatably fixed to the panel 1b, and passing through it.

In correspondence with the internal surface of such panel 1b, there is a toothed sector 4d, fitted on the end of each pin 4c extending below from the panel 1b.

In the following it will be examined only one group formed by arm, pin and toothed sector, for the sake of simplicity of exposition.

Naturally, what is written about one group is true also for the other one.

The toothed sector 4d engages a second toothed sector 8d fitted on a relative pin 8c rotatably fixed to the internal part of the panel 1b (FIG. 4).

An arm 8a is keyed onto the same pin 8c, and at one of the ends of this arm there is mounted a roll 8, which engages with a second guide 6 located alongside the first guide 15 (FIG. 2).

At the end opposite to the roll 8, the arm 8a is subjected to the action of an elastic means 9, e.g. spring, supported by a pin 9a attached to the internal part of the panel 1b (FIG. 4).

With reference to the FIG. 4, the arm 8a is constituted, as an example, by two sections forming an angle, with the pin 8c placed in correspondence with this angle.

The cited second guide 6 is bound to the fixed structure of the conveyor 10 and causes, in a manner described in the following, the transversal translation of the roll associated to the regulating means, in a direction D (FIG. 4) identical with the above cited direction X (FIG. 2).

Now the functioning of the device will be described. In a first embodiment, FIG. 1 shows schematically a plurality of holding units 1 mounted on the conveyor 10, in various operational positions.

In the following there will be discussed what happens to only one holding unit 1, obviously, all the described operations are repeated in the same manner on the others, as well.

Such positions are indicated by small numerals in sequence added to the letter P (P1, P2, etc.), indicating also the order in which the same positions occur.

For example, P1 (FIGS. 1 and 3) indicates a first operational position in which the walls 2 and the regulating means (of which only the part placed on the external part of the panel 1b is visible) are in a rest position, with the walls 2 distant at d1 equal to a prefixed value, coincident with the size of the article 30 being handled.

Such rest position is determined by the combined action of various elements constituting the above described regulating means; more precisely, in the position P1 the roll 8 is disengaged from the guide 6 (FIG. 3, position P1), so that only the spring 9 urges on the arm 8a and, consequently, on the toothed sectors 8d and 4d, and also on the arms 4b which pivot on the mobile wall 2 in the manner described above.

Such position P1 comes before the zone in which an article 30 is placed between such walls, such zone being set correspondently in a second operational position P2 along the conveyor 10.

According to the first embodiment, the device is provided with a guide 6 in a form that presents inclined sections not parallel to the first guide 15.

This feature is schematized in FIG. 3, where in the passage from the first to the second operational position, the roll 8 engages with the guide 6; that means that the guide 6 is moved nearer to the first guide 15.

In such a way, continuing to move nearer to the first guide 15, the second guide 6 determines a shifting of the roll 8 according to a line D1 in the direction D (FIG. 3).

This provokes a partial rotation of the toothed sector 8d in the direction A1 and the rotation of the toothed sectors 4d in the opposite direction B1 (FIG. 4).

Due to what above said, the associated arms 4b swivel describing an arc in a direction Y1 and the mobile wall 2 moves in a direction W2 (FIG. 2).

This movement continues up to a first fold point P12 (FIG. 3) of the guide 6 situated between the operational positions P1 and P2; in that point the guide 6 becomes again parallel to the guide 15, making stable the position taken by the regulating means and the mobile wall 2.

When, because of the proceeding of the conveyor 10 in the direction K, the operational position P2 is reached, the article 30 is loaded onto the panel 1b and between the walls 2.

Such operation is quite safe, without any possibility of jamming, because the walls 2 are at the distance d2 (FIG. 1), bigger than the size of the article 30.

Then the device moves towards a third operational position P3; in the zone comprised between the second and the third operational positions, the second guide 6 has a second fold point P23 (FIG. 3), from which an inclined section starts moving away from the guide 15.

Therefore there is a phase reverse to the one that precedently has determined the diverging movement of the walls 2; in fact, after the second fold point P23 the roll is moved in a direction D2 opposite to the direction D1 cited above.

So, the toothed sectors 8d and 4d rotate in directions A and B, respectively; the directions A and B are opposite to those A1 and B1, mentioned above.

As a consequence of all this, the arms 4a and 4b swivel describing an arc along a direction Y opposite to previous direction Y1.

The walls 2 are therefore brought near to each other until the roll 8 is again disengaged from the second guide 6 when it happens to be in correspondence with the third operational position P3; in this way the walls 2 are in the same distance as in the position P1, coincident with the size of the article 30, which now is handled by these walls (FIG. 1 in position P3).

From now on, and until the completion of its operational cycle, the device is in a state in which the regulating means and the second guide 6 are completely disengaged one from another.

In general term, according to the first embodiment, the second guide 6 is formed by a plurality of sections which are parallel to the guide 15 and located at a different distance from it.

The walls 2 remain permanently at a mutual constant distance while the holding runs along these parallel sections.

The sections that are parallel to the first guide 15 are joined by inclined sections, which are not parallel to the first guide 15.

The distance between the walls 2 changes accordingly when the holding unit happens to be in correspondence with these inclined sections.

Proceeding on the conveyor 10, the device moves successively to the operational positions P4 and P5, in correspondence with which the walls 2 keep on holding the article 30.

At this point the direction of the first guide 15 changes; this can be understood looking at FIG. 1, in which it is clearly seen that there is a misalignment of the holding units 1 in the operational positions included between the third position P3 and the fifth position P5.

The misalignment is possible only through a shifting of the slide 13 in the direction X1, as shown in FIGS. 1 and 2.

Such shifting takes place by shaping suitably the guide 15, with which the slide 13 is engaged, as already described.

However, such shifting does not affect in any way the mutual positioning of the regulating means, kept in the rest position by the spring 9.

At a sixth operational position P6, there is a casing machine, with associated pushing means 32 discussed above, shown in the figures.

These pushing means works beside the conveyor 10 and pushes perpendicularly, in respect of the conveyor advancement direction K, the article 30 running in the position P6.

The article 30 is thus pushed into a correspondent container 31 situated aside the conveyor 10 and on the part opposite to the pushing means 30.

The casing operation is summarized in its successive phases in FIG. 1, with the positions indicated by P6, P6a and P6b.

The unit 1 set free is moved by the conveyor 10 and goes to start a new cycle at the position P1.

In a second embodiment, the device has a second guide 6 which is kept constantly parallel to the first guide 15 and at a distance depending on the size of the article 30, being handled.

For example, the second guide 6 can extend as a closed loop like the first guide 15.

In such a case, the roll 8 and the associated regulating means are constantly engaged with the guide 6.

This solution is particularly indicated for containers having a well defined, rigid shape.

As far as the operation of the size change is concerned, for both the first and the second embodiment it is necessary to act on the mutual positioning between the guides 15 and 6, e.g. making the second guide 6 to translate in respect of the fixed structure of the conveyor 10.

This operation can be done using the same fastening means that bind the guide 6 to the conveyor 10, and which were mentioned in the introduction.

These fastening means are not indicated in the accompanying figures, as being in the reach of an average technician.

These fastening means can be constituted by e.g. threaded rods associated laterally with the guide 6, in such a way that when the threaded rods are move forward or backward inside the structure of the conveyor 10, perpendicularly in respect of the direction K in which the conveyor runs, the desired variation of the distance between the above cited guides 15 and 6 is obtained, this variation being correspondent to the necessary distance between the walls 2.

In order to better understand what happens when the two guides 15 and 6 are moved closer to each other, it is enough to think of the action performed by the guide according to the first embodiment, in which such a variation of the distance between the same guides provokes a variation of the distance between the walls.

A further explanation can be given by referring to FIGS. 5 and 6, where two possible relative arrangements between the guide 6 and the roll 8 with associated arm 8a are shown.

More precisely, in FIG. 5 the regulating means, connected to the roll 8 engaged with the guide 6, keep the walls 2 at a first distance d0, correspondent to the size of a first article 30, as schematized in FIG. 5a.

On the contrary, in FIG. 6 the regulating means keep the walls at a second distance d10, bigger than the first distance d0, correspondent to the size of a second type of article 30, as illustrated in FIG. 6a.

From what it is said the advantages of a device according to the proposed invention become evident, among these advantages there are those resulting from the fact that, particularly in the first embodiment, all the risks connected with any kind of jamming are completely eliminated.

In fact, the previous displacement of the walls while receiving the relative article, allows the latter to be inserted without any obstacle, with a considerable increase of reliability of the whole device.

All that positively affect all the production cycles performed with such device.

Furthermore, the same size change operation is rapid and considerably simplified, so that can be done by any person, even not specialized; also this effects positively both the time and, consequently, final costs.

Moreover, rapidity and simplicity contribute to considerable reduction of dead times at every size change operation, much more when such operation is carried out rather often.

What is claimed is:

1. In a closed loop conveyor located between a single article dispensing machine and a packing machine said conveyor comprising two lateral chains connected with each other by a plurality of couples of transversal stems, each couple of stems supporting a gliding slide having a first roll running inside a first guide, so that said slide is made to translate in a direction normal to an advancement direction of said conveyor; a device for receiving and synchronized transferring various articles, this device comprising a unit for holding at least one article, said unit including at least one panel fastened to said slide, two walls, positioned in the upper part of said panel, with normal attitude in respect to said advancement direction of said conveyor, with at least one of these walls being mobile in accordance with said advancement direction, and means for regulating the mutual distance between said walls, said regulating means including:

a second guide bound to a fixed structure of said conveyor at a side of said first guide;

at least one first arm journaled with one end to said mobile wall and with the other end, fitted to a first pin, rotatably supported by said panel, said first pin passing through said panel so as to extend downwards with one end;

at least one first toothed sector fitted on said end of said first pin extending below from said panel;

a second toothed sector keyed onto a second pin rotatably fastened to internal surface of said panel, said second toothed sector engaging with said first toothed sector;

a second arm fixed to said second toothed sector, said second arm supporting a second roll engaging with said second guide;

elastic means acting on an end of said second arm opposite to said second roll.

2. A device as in claim 1 wherein said second guide extends parallel to said first guide and at a distance which depends on the size of said articles.

3. A device as in claim 2, wherein said second guide is in the form of a closed loop.

4. A device as in claim 1, wherein said second guide is formed by a plurality of sections parallel to said first guide, each parallel section being placed at a different distance from said guide and suitably joined with one another, with one of said parallel sections being placed at a distance from said first guide such that said walls are kept at a distance bigger than the size of said articles when said unit is in correspondence with the zone where an article is being inserted between said walls, while the other sections are placed at a distance from said first guide such that said walls are kept at a distance equal to the size of said articles when said unit is not in correspondence with the zone where the articles are inserted between said walls.

5. A device as in claim 1, wherein said second arm includes two sections forming an angle, with the said first pin placed in correspondence with this angle.

* * * * *